(12) United States Patent
Sanpei et al.

(10) Patent No.: US 6,959,232 B2
(45) Date of Patent: Oct. 25, 2005

(54) FORCE SENSE IMPARTING TYPE INPUT APPARATUS

(75) Inventors: Yoshio Sanpei, Miyagi-ken (JP); Kaiji Nonaka, Miyagi-ken (JP); Ayumu Kobayashi, Miyagi-ken (JP); Ken Shibazaki, Miyagi-ken (JP); Noriyuki Fukushima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 39 days.

(21) Appl. No.: 10/727,294

(22) Filed: Dec. 3, 2003

(65) Prior Publication Data
US 2004/0118230 A1    Jun. 24, 2004

(30) Foreign Application Priority Data
Dec. 9, 2002    (JP) ............................. 2002-356887

(51) Int. Cl.[7] ............................. G01M 1/38; H02P 7/00
(52) U.S. Cl. .................. 700/275; 700/83; 700/264
(58) Field of Search ............................. 700/17, 83, 85, 700/90, 264, 275; 345/161, 162; 463/38

(56) References Cited

U.S. PATENT DOCUMENTS

| | | | |
|---|---|---|---|
| 5,303,080 A | * | 4/1994 | O'Brien et al. ............. 359/196 |
| 5,691,898 A | | 11/1997 | Rosenberg et al. |
| 5,767,839 A | * | 6/1998 | Rosenberg .................. 345/161 |
| 5,796,927 A | * | 8/1998 | Hegg .......................... 700/260 |
| 5,952,806 A | * | 9/1999 | Muramatsu ............ 318/568.12 |
| 2002/0020236 A1 | | 2/2002 | Onodera |

FOREIGN PATENT DOCUMENTS

JP        2002-149324        11/2000

* cited by examiner

Primary Examiner—Jayprakash N. Gandhi
(74) Attorney, Agent, or Firm—Brinks Hofer Gilson & Lione

(57) ABSTRACT

A force sense imparting type input apparatus includes an operation portion, an actuator for imparting a force sense to the operation portion, a position sensor for detecting an operating direction and an operating quantity of the operation portion, a temperature sensor for detecting a temperature of the actuator, and a controller for acquiring a position signal and a temperature signal and outputting driving signal of the actuator. A correction control portion provided to the controller determines a calorific value of the actuator from the temperature signal, then a correction value of driving power supplied to the actuator from the calorific value so calculated, adds a correction value of driving power of the actuator at the time of a normal operation and decides driving power of the actuator at the time of over-heat.

2 Claims, 2 Drawing Sheets

FORCE SENSE IMPARTING TYPE INPUT APPARATUS

This application claims the benefit of priority to Japanese Patent Application No. 2002-356887, herein incorporated by reference.

BACKGROUND OF THE INVENTION

1. Field of the Invention

This invention relates to a force sense imparting type input apparatus for imparting a force sense to an operation portion in accordance with an operating condition of the operation portion, and more particularly to over-heat prevention means of an actuator for imparting a force sense to the operation portion.

2. Description of Related Art

A force sense imparting type input apparatus including an operation portion operated by an operator, a position sensor for detecting an operating condition of the operation portion, an actuator for imparting a force sense to the operation portion, and a controller for controlling driving of the actuator in accordance with a position signal outputted from the position sensor and imparting a force sense corresponding to the operating condition of the operation portion to the operation portion has been proposed as an input apparatus to be applied to a bi-wire system car-mounted electric equipment concentrated control apparatus, a steering apparatus, a gear shift apparatus or a brake apparatus (refer to patent document 1, for example).

This force sense imparting type input apparatus can impart various kinds of force senses to the operation portion in accordance with an operating direction and an operating quantity of the operation portion. Therefore, a predetermined operation feeling can be imparted to the operation of the operation portion in various kinds of the bi-wire systems.

[Patent Document]

Japanese Patent Laid-Open No. 149324/2002 (FIG. 3)

In the force sense imparting type input apparatus applied to the steering apparatus, or the like, described above, driving power is always supplied to the actuator during driving of a vehicle and the actuator is likely to be over-heated. Therefore, various problems occur due to over-heating such as damage of the actuator, fuming, exothermy, and so forth.

From the aspect of prevention of over-heat of the actuator, it is preferred to cut off the supply of driving power to the actuator when the temperature of the actuator reaches a predetermined value. When this method is used, however, the force sense applied to the operation portion abruptly disappears during driving of the vehicle. Therefore, the operation of the steering apparatus, etc is likely to become unstable and an unnecessary strain is undesirably applied to the driver.

This problem also holds true of the case where the supply of driving power is again made to the actuator in a stage where the temperature of the actuator drops below a predetermined value after the supply of driving power to the actuator is once cut off. Because the force sense is abruptly imparted to the operation portion during driving of the vehicle, the operation of the steering apparatus, etc, is likely to become unstable and the unnecessary strain is forcibly applied to the driver.

To eliminate such problems of the related art technology, the invention aims at providing a force sense imparting type input apparatus that can prevent over-heat of an actuator without deteriorating operation stability of an operation portion.

SUMMARY OF THE INVENTION

To accomplish the object described above, the invention provides first a force sense imparting type input apparatus comprising an operation portion operated by an operator, a position sensor for detecting an operating condition of the operation portion, an actuator for imparting a force sense to the operation portion, a temperature sensor for detecting a temperature of the actuator, and a controller for controlling driving of the actuator in accordance with a position signal outputted from the position sensor, imparting a predetermined force sense corresponding to the operating condition of the operation portion to the operation portion and decreasing a power supply value to the actuator when a signal value of a temperature signal outputted from the temperature sensor is above a predetermined value set in advance.

To accomplish the object described above, the invention provides secondly a force sense imparting type input apparatus comprising an operation portion operated by an operator, a position sensor for detecting an operating condition of the operation portion, an actuator for imparting a force sense to the operation portion, and a controller for controlling driving of the actuator in accordance with a position signal outputted from the position sensor, imparting a predetermined force sense corresponding to the operating condition of the operation portion to the operation portion, calculating a temperature of the actuator in accordance with the driving condition of the actuator and decreasing a power supply value to the actuator when the calculation value is above a predetermined value set in advance.

As described above, the temperature sensor detects the temperature of the actuator and the power supply value to the actuator is lowered when the signal value of the temperature signal outputted from the temperature sensor is above a predetermined value set in advance. Alternatively, the controller calculates the temperature of the actuator and the power supply value to the actuator is lowered when the calculation value is above a predetermined value set in advance. In either case, the calorific value of the actuator can be restricted and the occurrence of various problems resulting from over-heating of the actuator can be prevented in advance. Because the supply of driving power of the actuator is not stopped and the application of the force sense to the operation portion is continued, operation stability of the operation portion can be maintained. When the driving power value supplied to the actuator is increased in a stage where the temperature of the actuator drops below a predetermined value, too, the difference of the force senses imparted to the operation portion can be reduced. Therefore, operation stability of the operation portion can be maintained.

BRIEF DESCRIPTION OF THE DRAWINS

DESCRIPTION OF THE PREFERRED EMBODIMENTS

Figure 1:
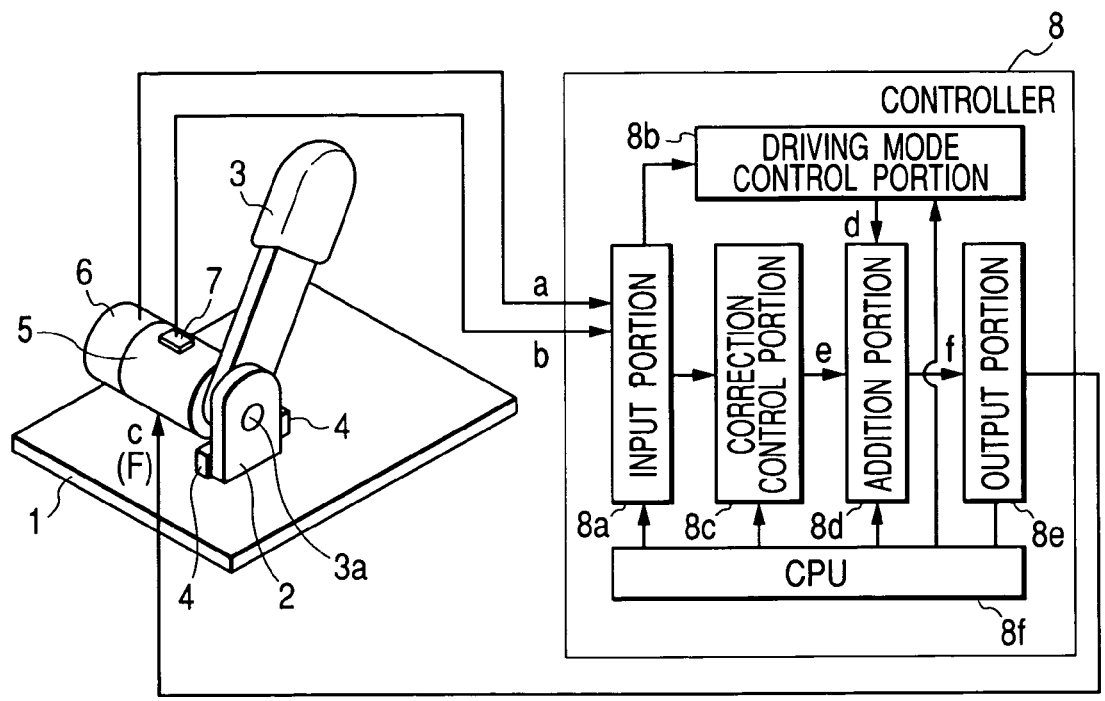
FIG. 1 is a structural view of a force sense imparting type input apparatus according to a first embodiment.
Figure 2:
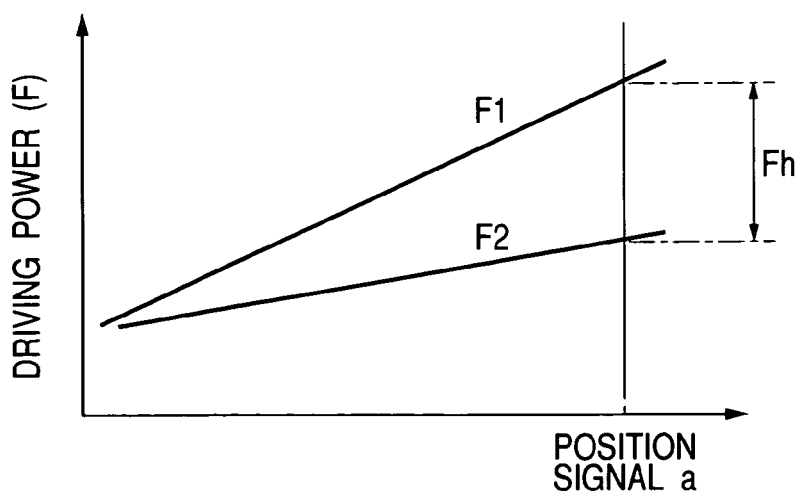
FIG. 2 is a graph exemplarily showing a correction method of actuator driving power by a correction control portion.

A force sense imparting type input apparatus according to a first embodiment of the invention will be hereinafter explained with reference to FIGS. 1 and 2. FIG. 1 is a structural view of the force sense imparting type input apparatus according to the first embodiment and FIG. 2 is a graph exemplarily showing a correction method of actuator driving power by a correction control portion.

As shown in FIG. 1, the force sense imparting type input apparatus according to this embodiment includes mainly a base 1, a bearing portion 2 provided to the base 1, an operation portion 3 one of the ends of which is rotatably supported by the bearing portion 2, a stopper 4 for restricting a moving range of the operation portion 3 provided to the base 1, an actuator 5 for imparting a force sense to the operation portion 3, connected to a rotary shaft 3a connecting the bearing portion 2 to the operation portion 3, a position sensor 6 for detecting an operating direction of the operation portion 3 and its operation quantity, a temperature sensor 7 for detecting a temperature of the actuator 5 and a controller 8 for acquiring a position signal a outputted from the position sensor 6 and a temperature signal b outputted from the temperature sensor 7 and outputting a driving signal c of the actuator 5.

A rotary motor, a linear motor and a solenoid can be used as the actuator 5. When the linear motor and the solenoid are used as the actuator 5, a predetermined power transmission mechanism for converting rotary motion of the rotary shaft 3a to linear motion and transmitting power is interposed between the actuator 5 and the rotary shaft 3a.

An encoder and a variable resistor that convert the operating quantity and the operating direction of the operation portion 3 to electric quantities are used as the position sensor 6.

A thermistor and a ceramic sensor for converting the temperature of the actuator 5 to an electric quantity and outputting the electric quantity are used as the temperature sensor 7.

As shown in FIG. 1, the controller 8 includes an input portion 8a for acquiring the position signal a outputted from the position sensor 6 and the temperature signal b outputted from the temperature sensor 7, a driving mode control portion 8b for generating a driving mode signal d of the actuator 5 on the basis of the position signal a described above and outputting the driving mode signal d, a correction control portion 8c for generating and outputting a correction signal e of driving power supplied to the actuator 5 on the basis of the temperature signal b, an addition portion 8d for adding the driving mode signal d and the correction signal e and outputting a force sense signal f, an output portion 8e for converting the force sense signal f to driving power F (driving signal c) of the actuator 5 and outputting driving power F and a CPU 8f for controlling each portion 8a to 8e.

The technology described in Japanese Patent Laid-Open No. 149324/2002 previously proposed by the applicant of this invention can be utilized for the construction of the driving mode control portion 8b. Incidentally, a control system for an actuator, a manual operation portion, an actuator and an encoder of this known reference correspond respectively to the driving mode control portion 8b, the operation portion 3, the actuator 5 and the position sensor 6 of this application.

The correction control portion 8c determines a calorific value of the actuator 5 from the temperature signal b outputted from the temperature sensor 7, multiplies the calorific value by a predetermined coefficient to determine a correction value of driving power supplied to the actuator 5, and further adds the correction value to driving power of the actuator 5 capable of imparting a predetermined force sense to the operation portion 3 to determine driving power F of the actuator 5.

In other words, assuming that the temperature of the actuator 5 detected by the temperature sensor 7 is T, a unit time is t, the calorific value of the actuator 5 is Q, the coefficient is $-kq$ and the correction value of driving power is Fh, the calorific value Q of the actuator 5 can be obtained as the temperature change $\Delta T$ ($Q=\Delta T/t$) of the actuator 5 per unit time t. Therefore, the correction value Fh of driving power F can be obtained by multiplying the calorific value Q by the coefficient $-kq$ (Fh$=-kq\cdot Q$). When this correction value Fh is added to driving power F1 of the actuator 5 capable of imparting the predetermined force sense to the operation portion 3, driving power F2 of the actuator 5 at the time of heating can be obtained (F2=F1+Fh). Incidentally, when the correction value Fh is greater than 0, i.e. Fh>0, it means that the calorific value Q of the actuator 5 drops. Therefore, the output portion 8e outputs driving power F1 of the actuator 5 capable of imparting the predetermined force sense to the operation portion 3 by regarding Fh as 0, i.e. Fh=0.

When the correction value Fh has the relation Fh<0, therefore, driving power F2 of the actuator 5 is lower by the correction value Fh than driving power F1 of the actuator 5 during the normal operation as shown in FIG. 2, and cooling of the actuator 5 is made. When the correction value Fh again rises and satisfies the relation Fh>0, driving power F of the actuator 5 is switched to driving power F1 of the actuator 5 at the time of the normal operation.

In the force sense imparting type input apparatus according to this embodiment, the temperature sensor 7 detects the temperature of the actuator 5 and when the signal value of the temperature signal b outputted from the temperature sensor 7 exceeds a predetermined value set in advance, the power supply value to the actuator 5 is lowered. Therefore, the calorific value of the actuator 5 can be restricted and various problems resulting from over-heating of the actuator 5 can be prevented in advance. Because the supply of driving power to the actuator 5 is not stopped and the application of the force sense to the operation portion 3 is continued, operation stability of the operation portion 3 can be maintained. When the driving power value supplied to the actuator 5 is increased in the stage where the temperature of the actuator 5 drops below the predetermined value, too, the difference of the force senses imparted to the operation portion 3 can be decreased, and operation stability of the operation portion 3 can be maintained.

Incidentally, the embodiment described above employs the construction in which the correction control portion 8c always repeats the calculation of driving power F. However, it is also possible to employ the construction in which the correction control portion 8c starts calculating driving power F when the temperature of the actuator 5 exceeds a predetermined calculation start temperature, in place of the construction described above.

Figure 3:
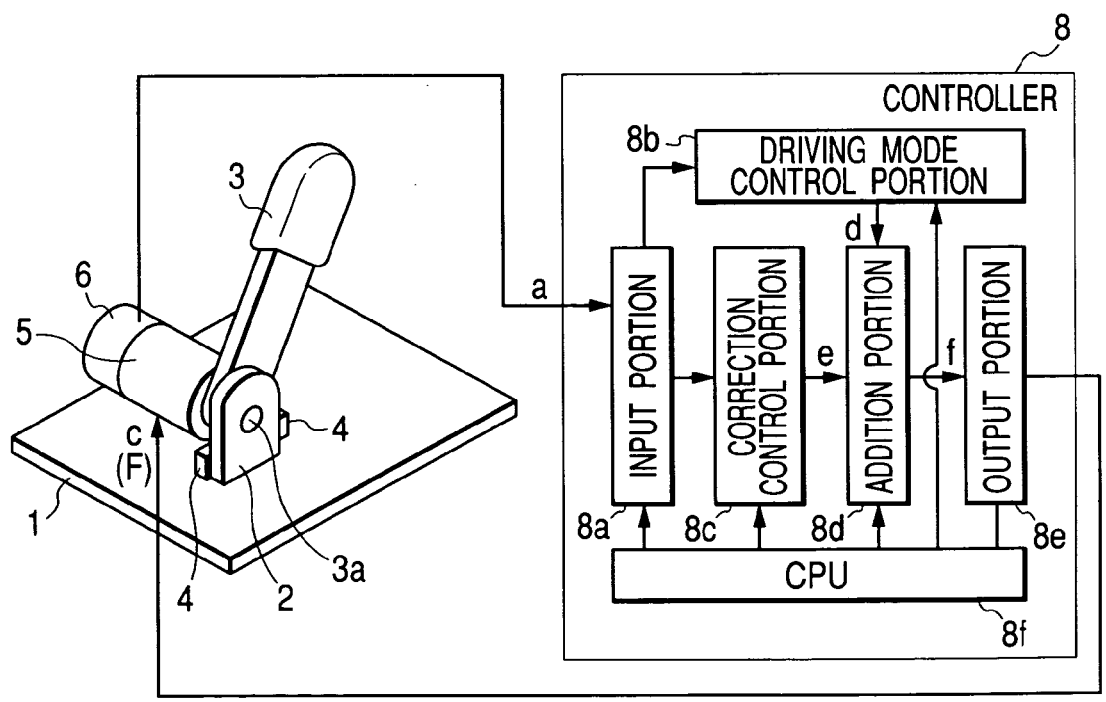
FIG. 3 is a structural view of a force sense imparting type input apparatus according to a second embodiment.

Next, a force sense imparting type input apparatus according to the second embodiment of the invention will be explained with reference to FIG. 3. FIG. 3 is a structural view of the force sense imparting type input apparatus according to the second embodiment.

As shown in FIG. 3, the force sense imparting type input apparatus according to this embodiment has its feature in that the temperature sensor 7 provided to the force sense imparting type input apparatus according to the first embodiment is omitted.

Unlike the force sense imparting type input apparatus according to the first embodiment, the correction control portion 8c determines the calorific value of the actuator 5 from the sum of the driving power value F of the actuator 5 and the product of the driving power value F and the driving time of the actuator 5, the heat radiation value of the actuator 5 from the sum of the driving times of the actuator 5 and the actual calorific value of the actuator 5 from the difference between the calorific value and the heat radiation value. The correction control portion 8c further determines the correction value of driving power supplied to the actuator 5 by multiplying the actual calorific value by a predetermined coefficient, and driving power F by adding the correction value to driving power of the actuator 5 capable of imparting a predetermined force sense to the operation portion 3.

In other words, assuming that the driving power value of the actuator 5 is F, the driving time of the actuator 5 at this driving power F is t, the calorific value coefficient is kq, the heat radiation coefficient is kt and the actual calorific value of the actuator 5 is Q, the calorific value of the actuator 5 can be acquired from $\Sigma kg \cdot F \cdot t$ and the heat radiation value of the actuator 5, from $\Sigma kt \cdot t$. Therefore, the actual calorific value Q of the actuator 5 can be acquired from $\Sigma kq \cdot F \cdot t - \Sigma kt \cdot t$. The correction value Fh of driving power F can be obtained by multiplying the actual calorific power value Q of the actuator 5 by the calorific value coefficient $-kq$ ($Fh = -kq \cdot Q$). When this correction value Fh is added to driving power F1 of the actuator 5 capable of imparting a predetermined force sense to the operation portion 3, driving power F2 of the actuator 5 at the time of heating can be determined (F2=F1+Fh). When the correction value Fh is Fh>0 in this embodiment, too, it means that the calorific value Q of the actuator 5 decreases. Therefore, driving power F1 of the actuator 5 capable of imparting the predetermined force sense to the operation portion 3 is outputted from the output portion 8e by setting Fh to Fh=0.

Since the rest of the portions are the same as those of the force sense imparting type input apparatus according to the first embodiment, the same reference numerals are allocated to the corresponding portions and their explanation will be omitted.

Therefore, in the force sense inputting type input apparatus according to this embodiment, too, when the correction value Fh is Fh<0, driving power F2 of the actuator 5 is lower by the correction value Fh than driving power F1 of the actuator 5 in the normal operation as shown in FIG. 2, and cooling of the actuator 5 is made. When the correction Fh becomes again Fh>0, driving power F of the actuator 5 is switched to driving power F1 of the actuator 5 at the time of the normal operation.

The force sense imparting type input apparatus according to this embodiment provides the same effect as that of the force sense imparting type input apparatus according to the first embodiment and can omit the temperature sensor. Therefore, the construction of the force sense imparting type input apparatus can be simplified and the production cost can be lowered.

Each of the embodiments given above explains the force sense imparting type input apparatus having the operation portion swinging in one direction by way of example but the gist of the invention is not limited thereto. The invention can be similarly applied to a force sense imparting type input apparatus having an operation portion swinging in multiple directions or in an arbitrary direction, or a force sense imparting type input apparatus having a rotary operation portion.

As explained above, in the force sense imparting type input apparatus according to the invention, the temperature sensor detects the temperature of the actuator and the controller lowers the power supply value to the actuator or calculates the temperature of the actuator when the signal value of the temperature signal outputted from the temperature sensor exceeds the predetermined value set in advance, and lowers the power supply value to the actuator when the calculated value exceeds the predetermined value set in advance. Therefore, the calorific value of the actuator can be restricted and various problems resulting from over-heating of the actuator can be prevented in advance. Moreover, because the supply of driving power to the actuator is not stopped and the application of the force sense to the operation portion is continued, operation stability of the operation portion can be maintained. When the driving power value supplied to the actuator is increased in the stage where the temperature of the actuator drops below the predetermined value, too, the difference of the force senses imparted to the operation portion can be reduced. Consequently, operation stability of the operation portion can be maintained.

What is claimed is:

1. A force sense imparting type input apparatus comprising:
   an operation portion operated by an operator;
   a position sensor for detecting an operating condition of said operation portion;
   an actuator for imparting a force sense to said operation portion;
   a temperature sensor for detecting a temperature of said actuator; and
   a controller for controlling driving of said actuator in accordance with a position signal outputted from said position sensor, imparting a predetermined force sense corresponding to the operating condition of said operation portion to said operation portion and decreasing a power supply value to said actuator without stopping supply of driving power to said actuator when a signal value of a temperature signal outputted from said temperature sensor is above a predetermined value set in advance.

2. A force sense imparting type input apparatus comprising:
   an operation portion operated by an operator;
   a position sensor for detecting an operating condition of said operation portion;
   an actuator for imparting a force sense to said operation portion; and
   a controller for controlling driving of said actuator in accordance with a position signal outputted from said position sensor, imparting a predetermined force sense corresponding to the operating condition of said operation portion to said operation portion, calculating a temperature of said actuator in accordance with the driving condition of said actuator and decreasing a power supply value to said actuator without stopping supply of driving power to said actuator when said calculation value is above a predetermined value set in advance.

* * * * *